J. P. BERGERON.
RECEPTACLE FOR HOLDING CIGARS.
APPLICATION FILED NOV. 29, 1907.
902,521. Patented Oct. 27, 1908.
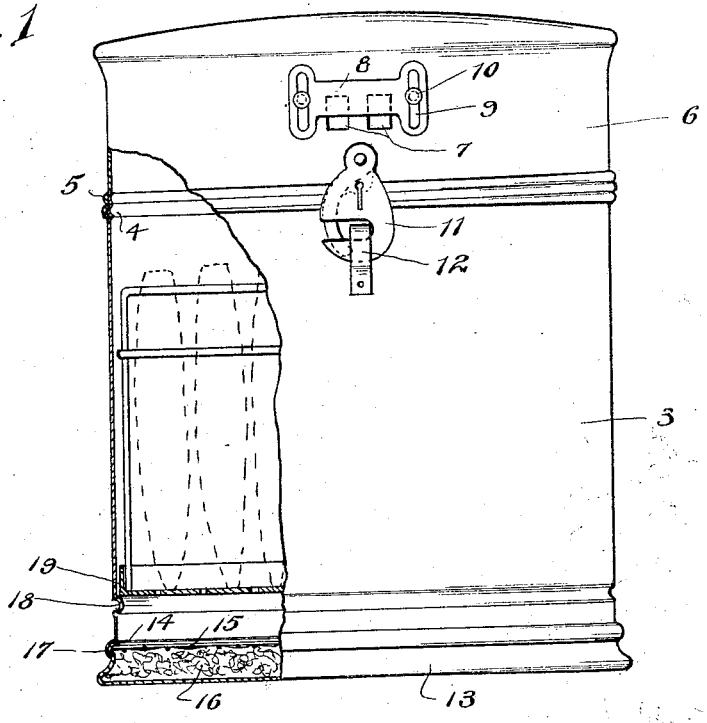
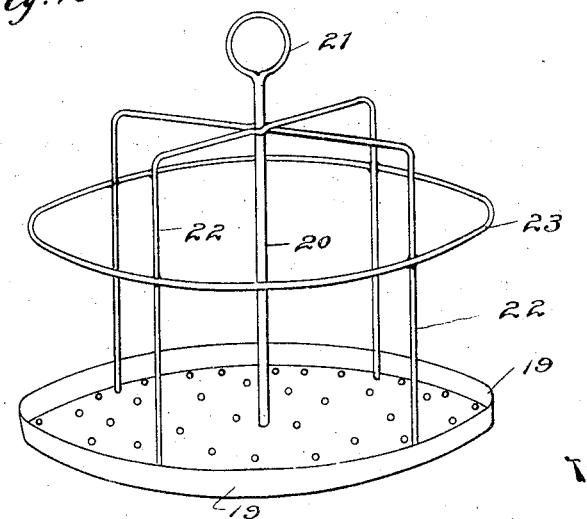
Witnesses:
Inventor,
Jay Pierre Bergeron,
By Glenn S. Noble
Att'y.

UNITED STATES PATENT OFFICE.

JAY PIERRE BERGERON, OF CHICAGO, ILLINOIS, ASSIGNOR OF ONE-HALF TO J. WYATT McGAFFEY, OF CHICAGO, ILLINOIS.

RECEPTACLE FOR HOLDING CIGARS.

No. 902,521.     Specification of Letters Patent.     Patented Oct. 27, 1908.

Application filed November 29, 1907. Serial No. 404,322.

*To all whom it may concern:*

Be it known that I, JAY PIERRE BERGERON, a citizen of the United States and resident of Chicago, in the county of Cook and State of Illinois, have invented certain new and useful Improvements in Receptacles for Holding Cigars, of which the following is a specification.

This invention relates more particularly to receptacles or devices for holding cigars, tobacco, or the like, and keep the same properly moistened, such devices being sometimes called humidors.

The objects of the present invention are to provide a simple form of such receptacle which can be made at a low cost, and also to combine with such a receptacle, a convenient rack or holder for supporting the cigars and for removing the same from the receptacle, as for instance, when it is desired to pass them around.

I have shown a preferred form of my invention in the accompanying drawings, in which—

Figure 1 represents a side view of the receptacle, a portion being broken away to show the interior construction; and Fig. 2 is a perspective view showing the removable rack or holder.

As indicated in the drawings, 3 represents the body portion of the receptacle, this portion being preferably of cylindrical form and provided at the top with screw threads 4 which are engaged by corresponding screw threads 5 of the cover 6. By means of this form of closure, the receptacle may be made substantially air-tight. In order to admit air into the receptacle, as for instance, when the cigars become too moist, I have provided openings 7 which are adapted to be closed, or the size of the opening regulated by means of a slide 8 which is provided at either end with slots 9 which engage with pins or rivets 10 in the cover 6. The cover may be locked in position by means of a lock 11 which engages with a loop or staple 12 on the body 3. The bottom 13 is formed substantially as shown in Fig. 1, with the upper edge 14 turned in or grooved to hold a wire netting or screen 15, underneath which is placed asbestos or other absorbent material 16 for holding the water. The lower edge 17 of the body 3 is formed around the upper edge 14, thereby connecting the body and bottom portions in a neat and convenient manner. At a short distance above the screen 15, the body 3 is provided with an inwardly-projecting ring 18 which is adapted to support the perforated bottom 19 of the removable rack or holder. This rack may be made in any desired form, for instance, as shown in Fig. 2, in which the bottom 19 is provided with a central upright rod 20 having a loop or ring 21 at the top for a handle and also being provided at or near the edges with upright wires 22 which are connected across the top and are also constructed with a circular wire or band 23 at a suitable distance above the bottom 19 to hold the cigars in vertical position. It will be readily seen that when the cigars have been placed in this rack or holder, they can be readily lowered into the receptacle and may also all be readily withdrawn in case it is desired to do so. A slight amount of water placed in the absorbent material 16 will keep the air within the receptacle properly moistened so that the cigars placed therein will not dry out or deteriorate.

Having thus described my invention, what I claim and desire to secure by Letters Patent is—

1. The combination with a receptacle for holding cigars or the like, of means within said receptacle for retaining moisture, a cover for said receptacle, and a removable rack or holder adapted to fit in said receptacle and to hold the cigars.

2. In a device of the character set forth, the combination of a body portion, an absorbent material in the bottom of said body portion, wire netting for holding said absorbent material, an inwardly-projecting ring in said body portion above said netting, and a perforated support for cigars or the like, resting on said ring.

3. In a device of the character set forth, the combination of a bottom portion, an absorbent material contained in said bottom portion, a wire netting over said absorbent material, said netting being held by the inturned upper edge of the bottom portion, a cylindrical body secured to said bottom portion, an inwardly-projecting ring in said body portion, a removable cigar rack resting on said ring, a screw cover for said body portion, a ventilator in said cover, and means for locking said cover in closed position.

JAY PIERRE BERGERON.

Witnesses:
B. C. BEAN,
A. W. FENSTEMAKER.